US012749764B2

(12) United States Patent
Miyake

(10) Patent No.: US 12,749,764 B2
(45) Date of Patent: Sep. 29, 2026

(54) BATTERY PLACEMENT RACK AND FIRE EXTINGUISHING DEVICE

(71) Applicant: TOYOTA JIDOSHA KABUSHIKI KAISHA, Toyota (JP)

(72) Inventor: Hideaki Miyake, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 183 days.

(21) Appl. No.: 18/732,946

(22) Filed: Jun. 4, 2024

(65) Prior Publication Data

US 2025/0030119 A1 Jan. 23, 2025

(30) Foreign Application Priority Data

Jul. 19, 2023 (JP) ................................ 2023-117557

(51) Int. Cl.

| | |
|---|---|
| ***H01M 50/383*** | (2021.01) |
| ***A62C 3/16*** | (2006.01) |
| ***A62C 31/00*** | (2006.01) |
| ***A62C 31/28*** | (2006.01) |
| ***H01M 50/204*** | (2021.01) |
| ***H01M 50/209*** | (2021.01) |
| ***H01M 50/251*** | (2021.01) |

(52) U.S. Cl.
CPC ............ *H01M 50/383* (2021.01); *A62C 3/16* (2013.01); *A62C 31/00* (2013.01); *A62C 31/28* (2013.01); *H01M 50/204* (2021.01); *H01M 50/209* (2021.01); *H01M 50/251* (2021.01); *Y02E 60/10* (2013.01)

(58) Field of Classification Search
CPC ............ H01M 50/383; H01M 50/209; H01M 50/204; H01M 50/251; A62C 3/16; A62C 31/00; A62C 31/28; Y02E 60/10
USPC ...................... 169/51, 26; 312/242; 239/288
See application file for complete search history.

(56) References Cited

U.S. PATENT DOCUMENTS

| | | | | |
|---|---|---|---|---|
| 11,833,377 | B2 * | 12/2023 | Ginder | A62C 35/026 |
| 2019/0174651 | A1 * | 6/2019 | Crawford | H05K 7/1497 |
| 2020/0139178 | A1 * | 5/2020 | Olivo | A62C 35/68 |
| 2022/0320632 | A1 * | 10/2022 | Son | H01M 10/613 |
| 2022/0355139 | A1 * | 11/2022 | Lee | A62C 3/16 |
| 2022/0384890 | A1 * | 12/2022 | Seok | H01M 50/273 |
| 2023/0040296 | A1 * | 2/2023 | Jeong | A62C 3/16 |

(Continued)

FOREIGN PATENT DOCUMENTS

| | | | |
|---|---|---|---|
| JP | 2015122166 A | * | 7/2015 |
| JP | 2022-182332 A | | 12/2022 |

*Primary Examiner* — Kevin Edward Schwartz
(74) *Attorney, Agent, or Firm* — SoraIP, Inc.

(57) ABSTRACT

The battery placement rack includes a plurality of support portions arranged so as to be spaced apart from each other in the up-down direction, and a plurality of lateral guide plates arranged below each support portion and laterally guiding the flow of the fire extinguishing agent. Each of the support portions includes a placement portion on which the battery unit can be mounted, and an opening formed on a side of the placement portion to allow the fire extinguishing agent to flow down. The lateral guide plate has an edge portion that causes the fire extinguishing agent flowing down through the opening in the support portion located above the lateral guide plate to flow down toward the placement portion in the support portion located below the lateral guide plate.

3 Claims, 4 Drawing Sheets

(56) References Cited

U.S. PATENT DOCUMENTS

| | | | | |
|---|---|---|---|---|
| 2023/0344074 | A1* | 10/2023 | Vandemark ......... | H01M 50/273 |
| 2025/0023216 | A1* | 1/2025 | Kim .................... | H01M 10/613 |
| 2025/0205526 | A1* | 6/2025 | Ryu .................... | H01M 50/691 |

* cited by examiner

BATTERY PLACEMENT RACK AND FIRE EXTINGUISHING DEVICE

CROSS-REFERENCE TO RELATED APPLICATION

This application claims priority to Japanese Patent Application No. 2023-117557 filed on Jul. 19, 2023, incorporated herein by reference in its entirety.

BACKGROUND

1. Technical Field

The present disclosure relates to a battery placement rack and a fire extinguishing device.

2. Description of Related Art

For example, Japanese Unexamined Patent Application Publication No. 2022-182332 (JP 2022-182332 A) discloses a fire-extinguishing and charging locker, including a main body box including a plurality of storage boxes, and a fire extinguishing agent tube. Each storage box is capable of storing a battery or the like. The fire extinguishing agent tube is routed so as to pass through all of the storage boxes.

SUMMARY

In the fire-extinguishing and charging locker described in JP 2022-182332 A, when the fire-extinguishing tube melts due to ignition of a battery, for example, fire extinguishing agent is sprayed from a melted portion thereof, and thus there is a concern that the fire extinguishing agent will not be supplied to a downstream side of the melted portion.

An object of the present disclosure is to provide a battery placement rack and a fire extinguishing device capable of suppressing insufficient supply of fire extinguishing agent to a downstream side in a supply direction of the fire extinguishing agent.

A battery placement rack according to an aspect of the present disclosure includes a plurality of support portions disposed arrayed at intervals in an up-down direction, each support portion supporting a battery unit, and a plurality of lateral guide plates disposed downward from the support portions, for guiding a flow of a fire extinguishing agent in a lateral direction, in which each support portion includes a placement portion that is configured to receive placement of the battery unit, and an opening that is opened on a side of the placement portion to cause the fire extinguishing agent to flow down, and the lateral guide plates include an edge portion that causes the fire extinguishing agent, flowing down through the openings in the support portions situated upward from the lateral guide plates, to flow down toward the placement portions of the support portions situated downward from the lateral guide plates.

A fire extinguishing device according to an aspect of the present disclosure includes the above-described battery placement rack, and a fire extinguishing agent supply unit that is provided upward from the battery placement rack and that supplies the fire extinguishing agent.

According to the present disclosure, a battery placement rack and a fire extinguishing device capable of suppressing insufficient supply of fire extinguishing agent to a downstream side in a supply direction of the fire extinguishing agent can be provided.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
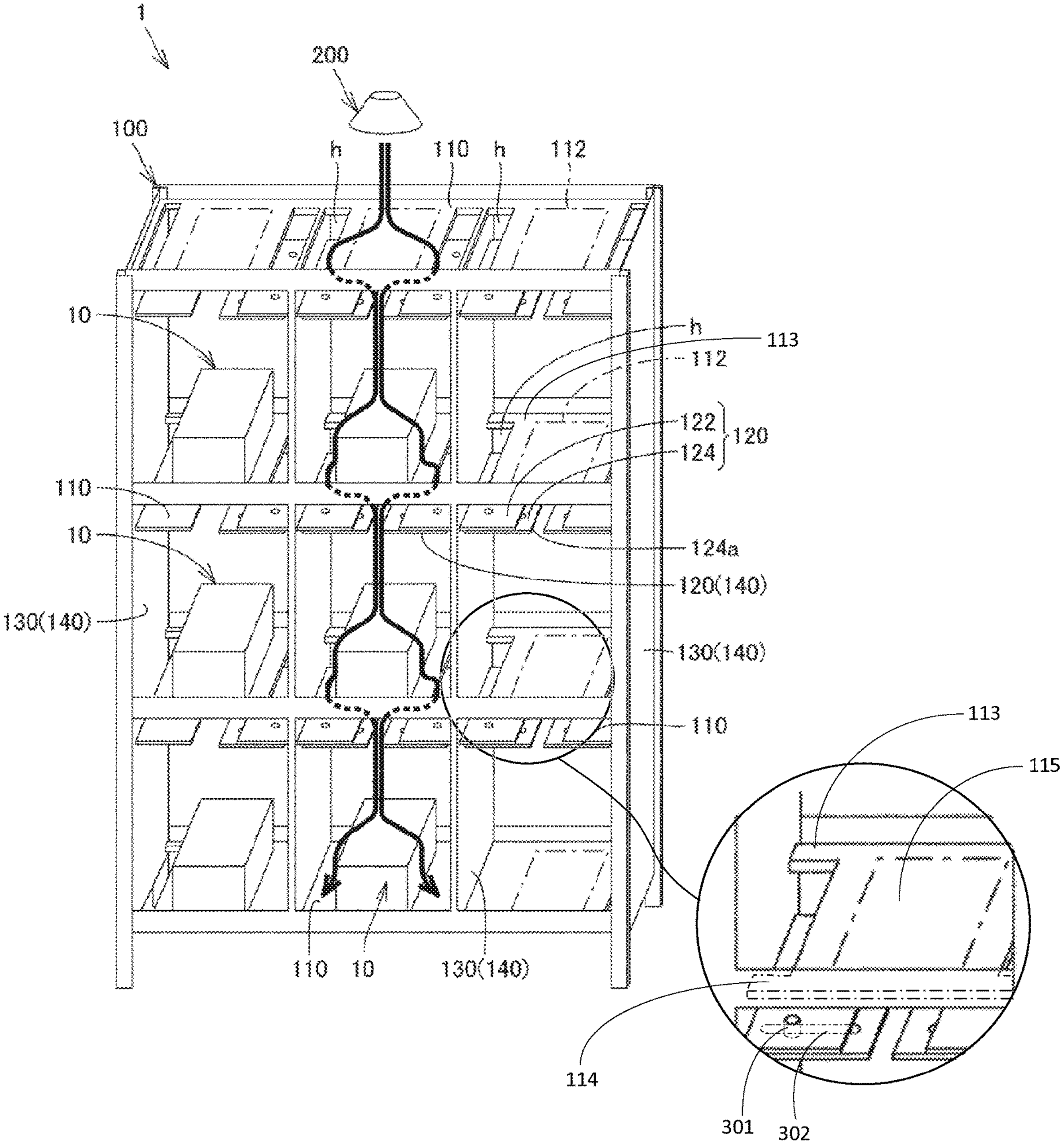
FIG. 1 is a perspective view schematically showing a fire extinguishing device including a battery placement rack according to a first embodiment of the present disclosure.

Embodiments of the present disclosure will be described with reference to the drawings. In the drawings referred to below, the same or corresponding members are denoted by the same reference numerals.

First Embodiment

Figure 2:
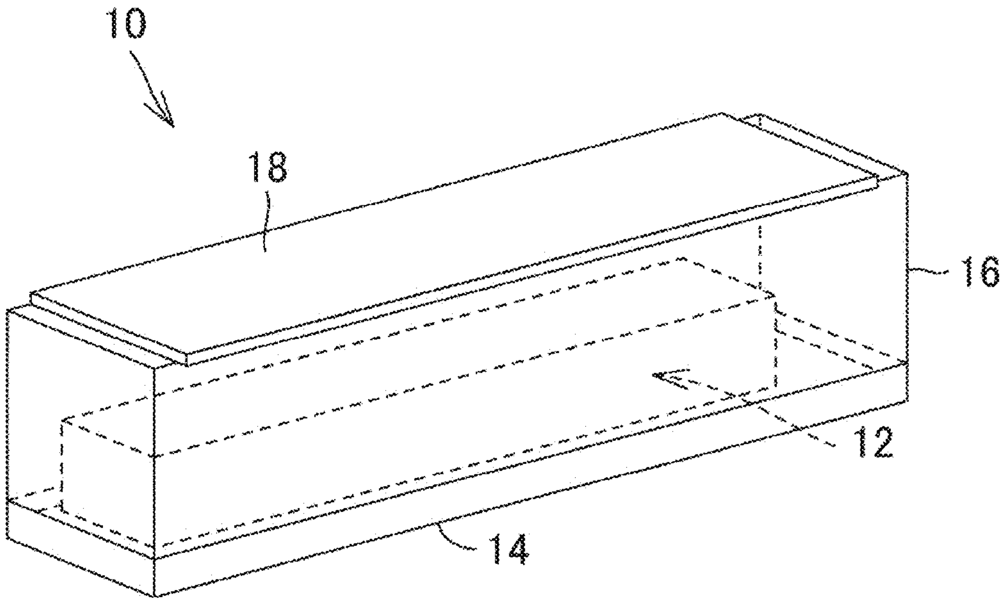
FIG. 2 is a perspective view schematically showing a battery unit.

FIG. 1 is a perspective view schematically showing a fire extinguishing device including a battery placement rack according to a first embodiment of the present disclosure. FIG. 2 is a perspective view schematically showing a battery unit.

As illustrated in FIG. 2, the battery unit 10 includes a cell stack 12, a tray 14, a cover 16, and a fire extinguishing agent holding member 18. The cell stack 12 is formed by arranging a plurality of power storage cells in one direction. The tray 14 supports the cell stack 12. The cover 16 houses the cell stack 12 together with the tray 14. The tray 14 and the cover 16 are made of, for example, metal. The fire extinguishing agent holding member 18 is a member capable of holding the fire extinguishing agent 20 (see FIG. 1). Examples of the fire extinguishing agent holding member 18 include a gypsum board and the like. Note that the battery unit 10 may be constituted by only the cell stack 12 or may be constituted by a single power storage cell.

As illustrated in FIG. 1, the fire extinguishing device 1 includes a battery placement rack 100 and a fire extinguishing agent supply unit 200.

The fire extinguishing agent supply unit 200 supplies or injects the fire extinguishing agent 20 such as water. Examples of the fire extinguishing agent supply unit 200 include a sprinkler and a device that supplies a fire extinguishing agent by gravity or pump pressure by opening a valve. The fire extinguishing agent supply unit 200 is disposed above the battery placement rack 100. The fire extinguishing agent supply unit 200 supplies the fire extinguishing agent 20 downward.

The battery placement rack 100 is a shelf on which a plurality of battery units 10 can be placed. The battery placement rack 100 includes a plurality of support portions 110, a plurality of lateral guide plates 120, a plurality of upright plates 130, and a fire extinguishing agent holding member 140. Each of the support portion 110, each of the lateral guide plates 120, and each of the upright plates 130 is made of, for example, metal.

The plurality of support portions 110 are arranged side by side at intervals in the up-down direction. Each support portion 110 supports the battery unit 10. In the example illustrated in FIG. 1, the plurality of support portions 110 are arranged in three rows in the lateral direction and arranged in four rows in the up-down direction. In the present embodiment, each support portion 110 is formed in a flat plate shape. Each support 110 is supported by four support portions.

Each support portion 110 has a placement portion 112 and an opening h. In FIG. 1, the placement portion 112 is indicated by a dashed-dotted line.

The placement portion 112 is a portion on which the battery unit 10 can be placed. The placement portion 112 is formed flat.

The opening h is a portion where the fire extinguishing agent 20 flows down. The opening h is formed by a through-hole. The opening h is formed on the side of the placement portion 112. Specifically, the opening h is formed on both sides of the placement portion 112 in the lateral direction (horizontal direction). The opening h has a shape that extends long in the depth direction (a direction orthogonal to both the up-down direction and the lateral direction).

Each lateral guide plate 120 directs the flow of fire extinguishing agent 20 laterally. Note that the "lateral direction" includes not only a horizontal direction but also a direction intersecting the horizontal in a range in which the fire extinguishing agent 20 can be guided. Each lateral guide plate 120 is disposed below each support portion 110. The lateral guide plate 120 has an edge portion 124*a* that causes the fire extinguishing agent 20 flowing down through the opening h in the support portion 110 located above the lateral guide plate 120 to flow down toward the placement portion 112 in the support portion 110 located below the lateral guide plate 120. The edge portion 124*a* is positioned vertically above the placement portion 112.

As shown in FIG. 1, the lateral guide plate 120 includes a lateral guide plate main body 122 and a moving plate 124.

The lateral guide plate main body 122 is located below the opening h and receives the fire extinguishing agent 20 flowing down through the opening h. The lateral guide plate main body 122 is formed in a flat plate shape.

The moving plate 124 is movable relative to the lateral guide plate main body 122 in the lateral direction. For example, the guide pin 301 may be fixed to the lateral guide plate main body 122, and the guide pin 301 may be inserted through the moving plate 124 and an insertion hole 302 extending in the lateral direction may be provided. The moving plate 124 includes an edge portion 124*a*.

Each upright plate 130 partitions a pair of openings h adjacent to each other in the lateral direction. Each upright plate 130 is formed in a flat plate shape. Each upright plate 130 supports a lateral guide plate main body 122.

The fire extinguishing agent holding member 140 is capable of holding the fire extinguishing agent 20. Examples of the fire extinguishing agent holding member 140 include a gypsum board and the like. The fire extinguishing agent holding member 140 may be provided on the lower surface of the support portion 110 or may be provided on the lower surface of the lateral guide plate 120. The fire extinguishing agent holding member 140 may be provided on the surface of the upright plate 130.

As described above, in the fire extinguishing device 1 according to the present embodiment, when the fire extinguishing agent 20 is supplied from above the battery placement rack 100, as indicated by an arrow in FIG. 1, the fire extinguishing agent 20 flows down through the opening h of the support portion 110, is received by the lateral guide plate 120, is guided laterally, and flows down from the edge portion 124*a* of the lateral guide plate 120 toward the lower placement portion 112. Therefore, insufficient supply of the fire extinguishing agent 20 to the downstream side in the supply direction (downward or the like) of the fire extinguishing agent 20 is suppressed.

Second Embodiment

Figure 3:
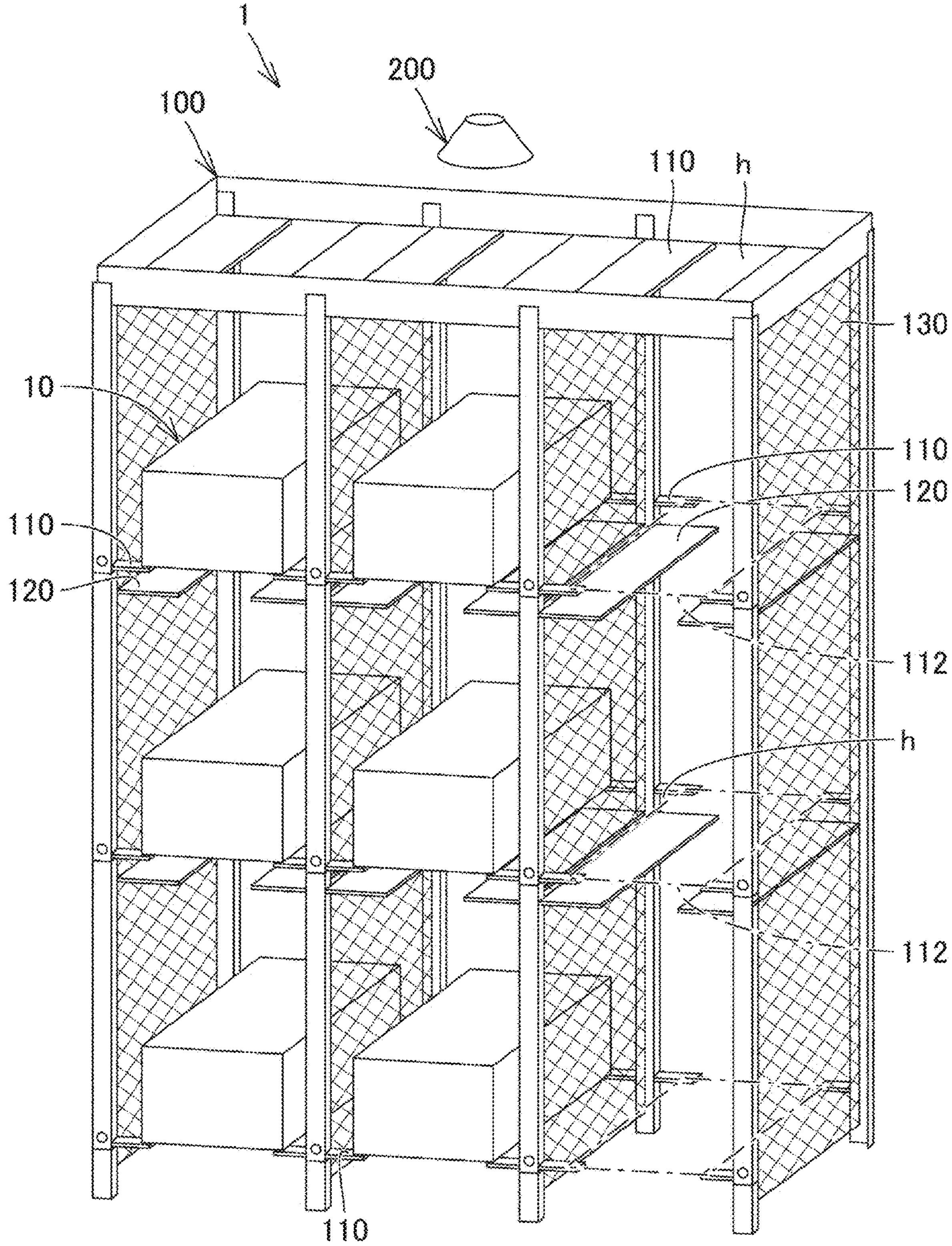
FIG. 3 is a perspective view schematically illustrating a fire extinguishing device including a battery placement rack according to a second embodiment of the present disclosure.

Next, the battery placement rack 100 according to the second embodiment of the present disclosure will be described with reference to FIG. 3. Note that, in the second embodiment, only portions different from those of the first embodiment will be described, and description of the same structure, operation, and effects as those of the first embodiment will not be repeated.

In the present embodiment, each of the support portions 110 is constituted by four support pieces that support the corner portions of the bottom surface of the battery unit 10, and the pair of support pieces in the depth direction constitutes the opening h.

The upright plate 130 is formed in a mesh shape.

Third Embodiment

Figure 4:
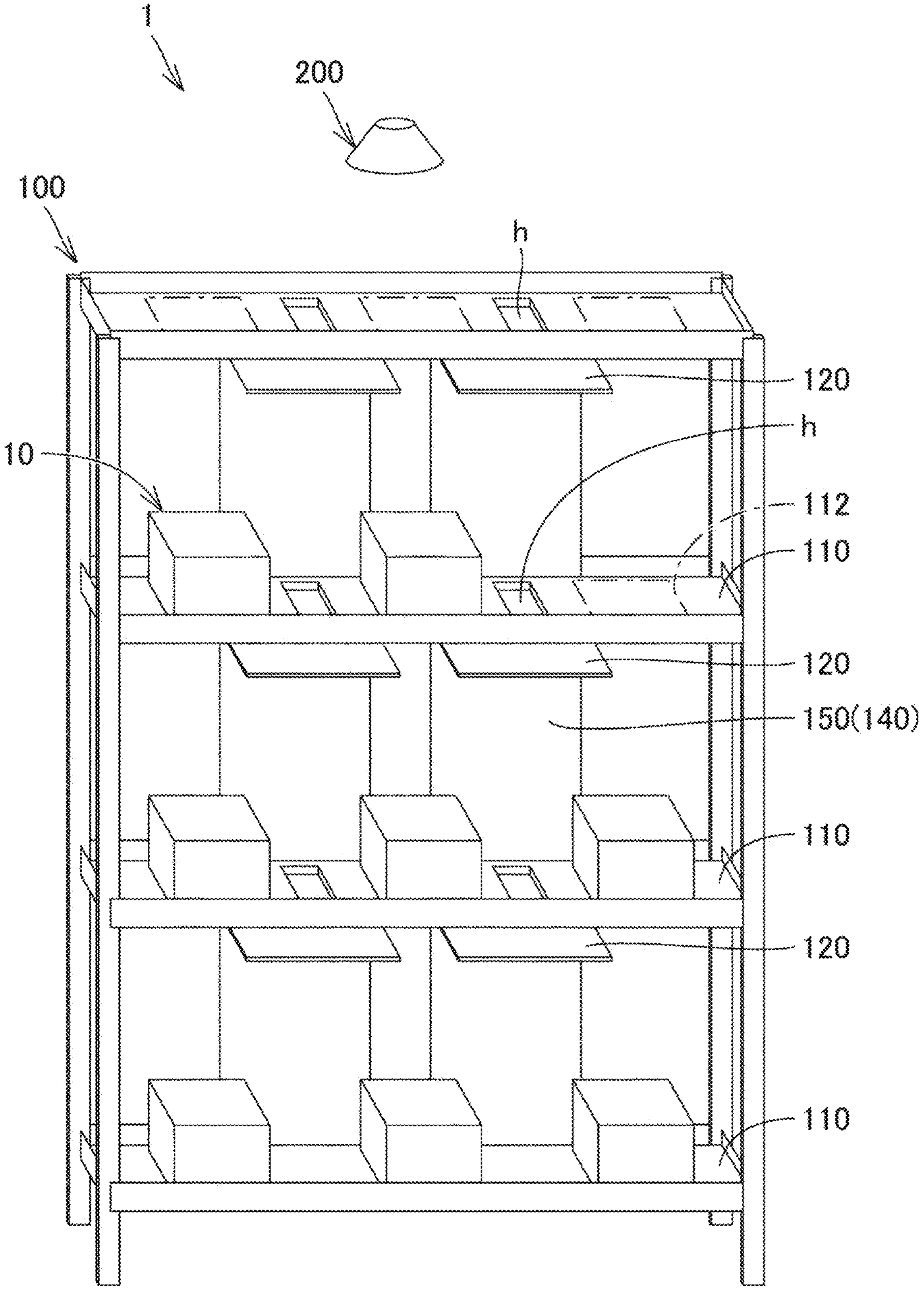
FIG. 4 is a perspective view schematically showing a fire extinguishing device including a battery placement rack according to a third embodiment of the present disclosure.

Next, the battery placement rack 100 according to the third embodiment of the present disclosure will be described with reference to FIG. 4. In the third embodiment, only portions different from those of the first embodiment will be described, and description of the same structure, operation, and effects as those of the first embodiment will not be repeated.

In the present embodiment, the upright plate 130 is omitted, and each lateral guide plate 120 is supported by the back support plate 150. The back support plate 150 stands up from one end of the support portion 110 in the depth direction. The back support plate 150 is formed in a flat plate shape. The lateral guide plate 120 is connected to an upper end portion of the back support plate 150. The lateral guide plate 120 and the back support plate 150 may be formed, for example, by bending a single metal plate. A fire extinguishing agent holding member 140 may be provided on the surface of the back support plate 150.

It will be understood by those skilled in the art that the exemplary embodiments described above are illustrative of the aspects described below.

Aspect 1

A plurality of support portions arranged side by side at intervals in the up-down direction and each supporting the battery unit; a plurality of lateral guide plates disposed below each support portion for laterally directing the flow of fire extinguishing agent; each support portion, a placement portion capable of mounting the battery unit, an opening formed on a side of the placement portion and allowing the fire extinguishing agent to flow down is included, the lateral guide plate has an edge portion for causing the fire extinguishing agent flowing down through the opening in the support portion located above the lateral guide plate to flow down toward the placement portion in the support portion located below the lateral guide plate in the battery placement rack.

In the battery placement rack, when the fire extinguishing agent (water or the like) is supplied from above the battery placement rack, the fire extinguishing agent flows down through the opening of the support portion, is received by the lateral guide plate, is guided in the lateral direction, and flows down from the edge portion of the lateral guide plate toward the lower placement portion. Therefore, insufficient supply of the fire extinguishing agent to the downstream side in the supply direction (downward or the like) of the fire extinguishing agent is suppressed.

Aspect 2

The lateral guide plate, a lateral guide plate main body located below said opening and receiving said fire extinguishing agent flowing down through said opening; the battery placement rack according to aspect 1, further comprising a moving plate that includes the edge portion and is movable relative to the lateral guide plate main body in a lateral direction.

In this aspect, by adjusting the lateral position of the moving plate with respect to the lateral guide plate main body, it is possible to adjust the flow-down position of the fire extinguishing agent.

Aspect 3

The battery placement rack of aspect 1 or 2, further comprising an upright plate partitioning a pair of the openings laterally adjacent to each other.

Aspect 4

The battery placement rack according to any one of aspects 1 to 3, further comprising a fire extinguishing agent holding member connected to a lower surface of at least one of the support portion and the lateral guide plate, the fire extinguishing agent holding member capable of holding the fire extinguishing agent.

In this aspect, when the battery unit ignites, the ignition is suppressed from reaching the other battery units.

Aspect 5

A battery placement rack according to any one of aspects 1 to 4, a fire extinguishing device comprising: a fire extinguishing agent supply unit provided above the battery placement rack and supplying the fire extinguishing agent.

It should be understood that the embodiments disclosed herein are illustrative and non-restrictive in all respects. The scope of the present disclosure is defined by the terms of the claims, rather than the description of the embodiments described above, and includes all modifications within the scope and meaning equivalent to the terms of the claims.

The disclosure provides a battery placement rack 100 including a first upright plate 130 and a second upright plate 130 spaced apart from each other in a lateral direction, a support plate 110 configured to support a first battery unit 10, the support plate 110 being coupled to the first upright plate 130 and the second upright plate 130, and a first lateral guide plate 120 disposed below the support plate 110 in a vertical direction. The support plate 110 includes (i) a first end portion 113 extending in the lateral direction and coupled to the first upright plate 130 and the second upright plate 130, (ii) a second end portion 114 provided opposite to the first end portion 113 in a longitudinal direction of the support plate 110, the second end portion 114 extending in the lateral direction and coupled to the first upright plate 130 and the second upright plate 130, and (iii) an intermediate portion 115 connecting the first end portion 113 and the second end portion 114. A width of the intermediate portion 115 in the lateral direction is smaller than a width of the first end portion 113 and the second end portion 114. The support plate 110 defines a first slot opening h and a second slot opening h, the first slot opening h being located between the first upright plate 130 and the intermediate portion 115 of the support plate 110. The second slot opening h is located between the second upright plate 130 and the intermediate portion 115 of the support plate 110. The first lateral guide plate 120 is in contact with the first upright plate 130 and extends in the lateral direction. The first lateral guide plate 120 includes a first lateral guide plate main body 122 and a first sub plate 124 that is movable relative to the first lateral guide plate main body 122 in the lateral direction. A first guide pin 301 is fixed to the first lateral guide plate main body 122. The first sub plate 124 includes a first guide slot 302 through which the first guide pin 301 is inserted, the first guide slot 302 extending in the lateral direction.

What is claimed is:

1. A battery placement rack comprising:

a first upright plate and a second upright plate spaced apart from each other in a lateral direction;

a support plate configured to support a first battery unit, the support plate being coupled to the first upright plate and the second upright plate; and a first lateral guide plate disposed below the support plate in a vertical direction, wherein the support plate includes (i) a first end portion extending in the lateral direction and coupled to the first upright plate and the second upright plate, (ii) a second end portion provided opposite to the first end portion in a longitudinal direction of the support plate, the second end portion extending in the lateral direction and coupled to the first upright plate and the second upright plate, and (iii) an intermediate portion connecting the first end portion and the second end portion, a width of the intermediate portion in the lateral direction is smaller than a width of the first end portion and the second end portion, the support plate defines a first slot opening and a second slot opening, the first slot opening being located between the first upright plate and the intermediate portion of the support plate, the second slot opening being located between the second upright plate and the intermediate portion of the support plate, the first lateral guide plate is in contact with the first upright plate and extends in the lateral direction, the first lateral guide plate includes a first lateral guide plate main body and a first sub plate that is movable relative to the first lateral guide plate main body in the lateral direction, a first guide pin is fixed to the first lateral guide plate main body, and the first sub plate includes a first guide slot through which the first guide pin is inserted, the first guide slot extending in the lateral direction.

2. The battery placement rack according to claim 1, wherein the first lateral guide plate has a longitudinal length greater than a longitudinal length of the first slot opening.

3. A fire extinguishing device comprising:

the battery placement rack according to claim 1; and a sprinkler disposed above the battery placement rack and configured to supply a fire extinguishing agent.

* * * * *